US006195540B1

(12) United States Patent
Ogino et al.

(10) Patent No.: US 6,195,540 B1
(45) Date of Patent: *Feb. 27, 2001

(54) FM MULTIPLE SIGNAL RECEIVABLE NAVIGATION APPARATUS

(75) Inventors: Toshikazu Ogino; Masashige Yamasaki, both of Kanagawa (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,065

(22) Filed: Oct. 30, 1997

(30) Foreign Application Priority Data

Oct. 31, 1996 (JP) .................................................. 8-305595

(51) Int. Cl.[7] ....................................................... H04B 1/06

(52) U.S. Cl. ........................... 455/344; 343/715; 343/901

(58) Field of Search ............................... 455/66, 289, 90, 455/575, 344, 348, 351, 212; 343/702, 715, 725, 729, 791, 792, 901, 700 MS

(56) References Cited

U.S. PATENT DOCUMENTS

| | | | | |
|---|---|---|---|---|
| 3,482,248 | * | 12/1969 | Jones, Jr. | 343/725 |
| 4,914,715 | * | 4/1990 | Miyata | 455/212 |
| 5,248,988 | * | 9/1993 | Makino | 343/792 |
| 5,541,615 | * | 7/1996 | Koide et al. | 343/901 |
| 5,543,808 | * | 8/1996 | Feigenbaum et al. | 343/725 |
| 5,594,952 | * | 1/1997 | Virtuoso et al. | 455/348 |
| 5,654,717 | * | 8/1997 | Nichols et al. | 343/700 MS |

FOREIGN PATENT DOCUMENTS 0 590 955 A2 9/1993 (EP) .

OTHER PUBLICATIONS

Patent Abstracts of Japan, vol. 096, No. 012, Dec. 26, 1996 & JP 08 204442 A (Mitsumi Electric Co LTD) Aug. 9, 1996, “Antenna Unit And Receiver with the Unit”, Ogino Toshikazu.

Patent Abstracts of Japan, vol. 018, No. 240 (E–1545) May 9, 1994 & JP 06 029711 A (NHK Spring Co LTD), Feb. 4, 1994, “Antenna for Automobile”, Hirai Isamu.

Patent Abstracts of Japan, vol. 095, No. 007, Aug. 31, 1995 & JP 07 099405 A (Asahi Glass Co LTD), Apr. 11, 1995, “Glass Antenna for Automobile”, Terajima Fumitaka.

* cited by examiner

*Primary Examiner*—Reinhard J. Eisenzopf
*Assistant Examiner*—Sam Bhattacharya
(74) *Attorney, Agent, or Firm*—McGuireWoods LLP

(57) ABSTRACT

A FM multiple signal receivable navigation apparatus is disclosed. A GPS signal receiving antenna unit and a GPS signal receiver unit are electrically connected by a coaxial cable. One end of the coaxial cable is connected with the GPS signal receiving antenna unit, and the other end of the cable is connected with the GPS signal receiver unit through a connector. A shield conductor of the coaxial cable is served as a FM multiple signal receiving antenna. The shield conductor is connected with a FM multiple signal receiver unit through a noise reduction member. The connector can be replaced by a PCMCIA (Personal Computer Memory Card International Association) card.

13 Claims, 3 Drawing Sheets

FIG.5
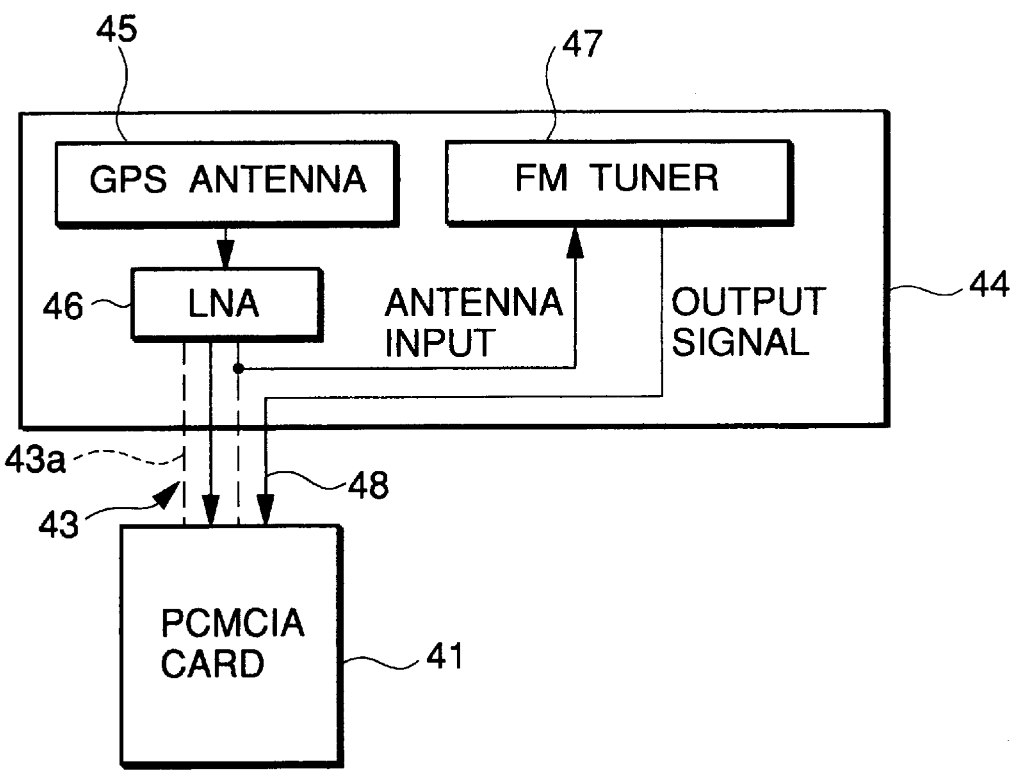
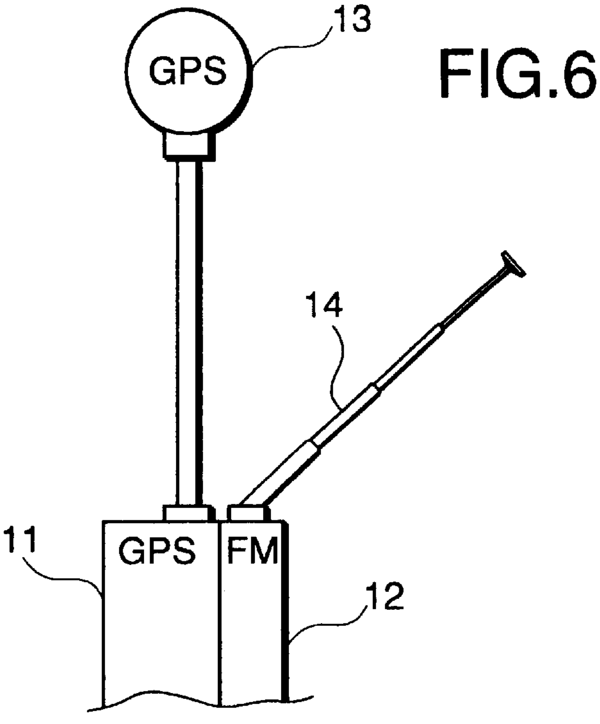
FIG.6

FM MULTIPLE SIGNAL RECEIVABLE NAVIGATION APPARATUS

BACKGROUND OF THE INVENTION

1. Technical Field of the Invention

The present invention relates to a FM multiple signal receivable navigation apparatus.

2. Description of Related Art

In these days, the navigation system has a function of receiving the road traffic condition which changes in real time through the FM multiple signal receiver and displaying it, in addition to the well known road map display function.

FIG. 6 shows one example of the conventional FM multiple signal receivable navigation apparatus. A GPS signal receiving antenna 13 and a FM multiple signal receiving antenna 14 are erected from a GPS receiver unit 11 and a FM multiple signal receiver unit 12 respectively, and the GPS receiver unit 11 and the FM multiple signal receiver unit 12 are assembled in one unit.

In this case, since the FM multiple signal is within 80 MHz band, and the GPS signal is within 1.5 GHz band, it is necessary to employ two antennas for receiving each wave. Moreover, the FM multiple signal receiving antenna 14 is a rod antenna, and the GPS signal receiving antenna 13 is a patch antenna, thus it is necessary to employ different kinds of antenna. As a result, since the space for the antennas enlarged, there would be some problems of handling or portability.

SUMMARY OF THE INVENTION

To solve the foregoing problems, the present invention provides a FM multiple signal receivable navigation apparatus including a coaxial cable connecting the GPS receiver unit and the GPS antenna. And the shield conductor of the coaxial cable is served as the FM multiple signal receiving antenna.

In this construction, it would be able to share the GPS antenna unit with the FM antenna unit. As a result, the space for the antennas is smaller than that of the conventional apparatus, thus its handling and portability have been improved remarkably.

BRIEF DESCRIPTION OF THE DRAWINGS

FIG. 5 is a diagram which shows the circuit construction of the FM multiple signal receivable navigation apparatus shown in FIG. 4.

FIG. 6 is an illustration of the fundamental construction of the conventional FM multiple signal receivable navigation apparatus.

DETAILED DESCRIPTION OF THE PREFERRED EMBODIMENTS

Figure 1:
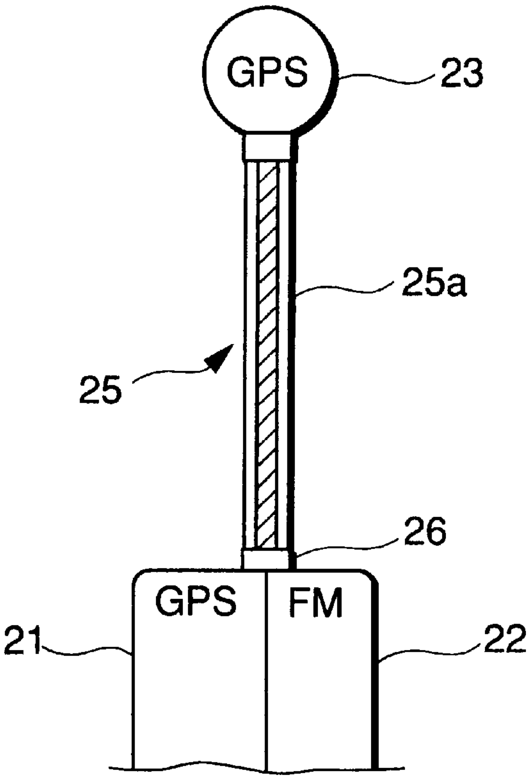
FIG. 1 is an illustration of the fundamental construction which shows the first embodiment of the FM multiple signal receivable navigation apparatus of the present invention.
Figure 2:
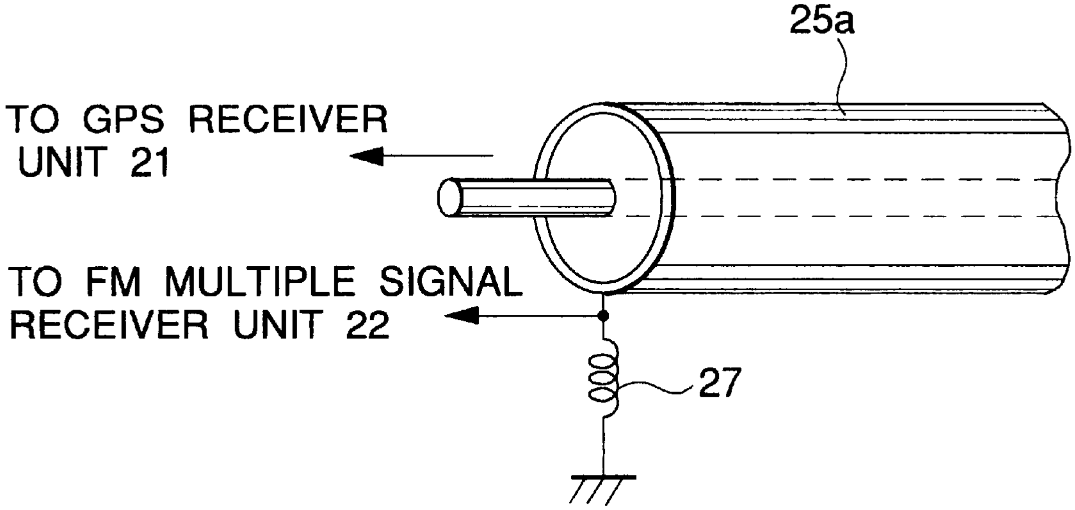
FIG. 2 is a schematic illustration which shows the situation shown in FIG. 1 that the shield conductor of the cable is connected with the antenna terminal of the FM multiple signal receiver.
Figure 3:
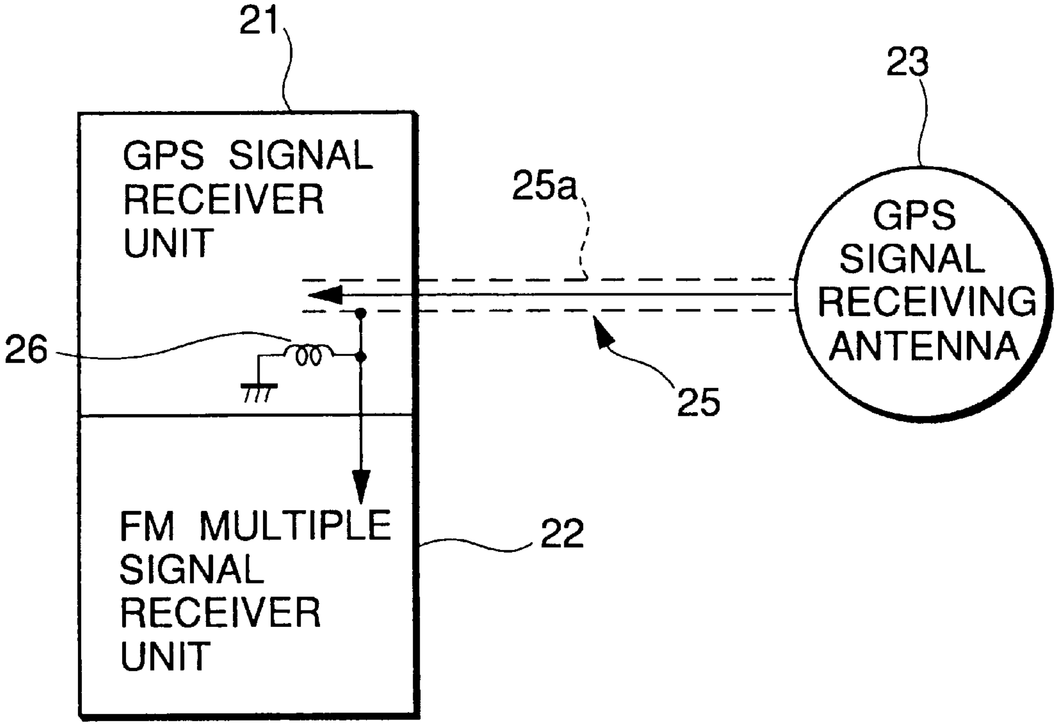
FIG. 3 is a circuit diagram which corresponds to FIG. 2.

FIG. 1 is an illustration of the fundamental construction which shows the first embodiment of the FM multiple signal receivable navigation apparatus of the present invention. In this figure, one end of a coaxial cable 25 is connected with an antenna unit which accommodates a GPS antenna 23, And the other end of the cable is connected by a connector 26 with a main body in which a GPS receiver unit 21 and a FM multiple signal receiver 22 are assembled in one unit. This is the fundamental part of the present invention. In theoretical description, as shown in FIG. 2, a shield conductor 25*a* of the coaxial cable 25 is connected with an antenna terminal of a FM tuner in the FM multiple signal receiver 22, and is grounded through a low-pass filter 27. FIG. 3 is a simplified circuit diagram which displays the circumstance of FIG. 2.

In this structure, the space for the antenna could be smaller than the conventional apparatus, and could be handled as well as using GPS antenna individually, that is not the FM multiple signal receivable apparatus. Moreover, portability is also improved remarkably.

Figure 4:
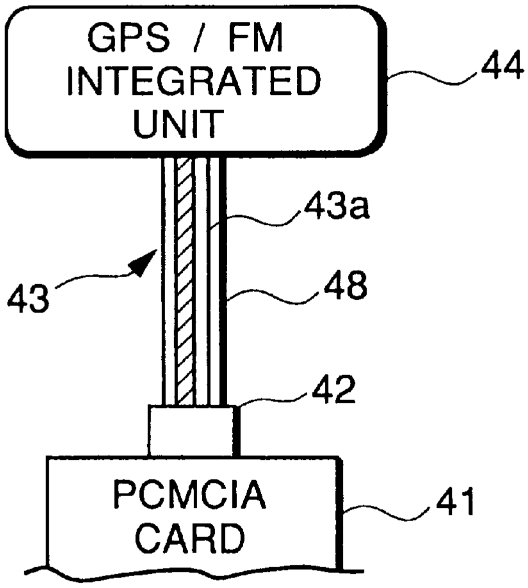
FIG. 4 is an illustration of the fundamental construction which shows the second embodiment of the FM multiple signal receivable navigation apparatus of the present invention.

FIG. 4 shows the second embodiment of the present invention, wherein a PCMCIA (Personal Computer Memory Card International Association) card 41 is utilized. In this figure, one end of a coaxial cable 43 is connected with an GPS/FM integrated unit 44, and the other end of the cable is connected with the PCMCIA card 41 through a connector 42. In the integrated unit 44, as shown in FIG. 5, a low noise amplifier (LNA) 46 and a tuner of a FM multiple signal receiver 47 are provided in addition to a GPS antenna 45. In this embodiment, as well as the first embodiment, a shield conductor 43*a* of the coaxial cable 43 is served as an FM multiple signal receiving antenna of the FM multiple signal receiver. Thus, the shield conductor 43*a* of the coaxial cable 43, that is FM multiple signal receiving antenna, is connected with the FM tuner 47 in the GPS/FM integrated unit 44, and the output of the FM tuner 47 is led to the PCMCIA card 41 through a cable 48 juxtaposed with the coaxial cable 43.

In this structure, it would be able to obtain sufficient space to lay out elements accommodated in the PCMCIA card 41. Moreover, it would not reduce the handling or the compactness since the low noise amplifier 46 and the FM tuner 47 accommodated in the GPS/FM integrated unit 44 are assembled with sufficient compactness nowadays.

As described above, in the present invention, the space for the antenna could be smaller than the conventional apparatus, and could be handled as well as using GPS antenna individually, that is not the FM multiple signal receivable apparatus. Moreover, portability is also improved remarkably.

What is claimed is:

1. A FM multiple signal receivable navigation apparatus comprising:

- a global positioning satellite (GPS) signal receiving antenna unit;
- a GPS signal receiver unit;
- an integral coaxial cable comprising an inner conductor wrapped in an insulator layer surrounded by an outer shield conductor electrically connecting said GPS signal receiving antenna unit with said GPS signal receiver unit;
- a FM multiple signal receiving antenna defined by said shield conductor of said coaxial cable; and
- a FM multiple signal receiver unit electrically connected to said FM multiple signal receiving antenna, said shield conductor of said coaxial cable antenna acting as an antenna only for said FM multiple signal receiver unit.

2. A FM multiple signal receivable navigation apparatus according to claim 1, wherein one end of said coaxial cable is connected with said GPS signal receiving antenna unit, and the other end of said coaxial cable is connected with said GPS signal receiver unit through a connector.

3. A FM multiple signal receivable navigation apparatus according to claim 2, wherein said FM signal receiver unit is accommodated in said GPS receiver unit.

4. A FM multiple signal receivable navigation apparatus according to claim 2, wherein said FM signal receiver unit is accommodated in said GPS signal receiving antenna unit.

5. A FM multiple signal receivable navigation apparatus according to claim 3, said GPS signal receiving antenna unit includes a GPS signal receiving antenna and an amplification member for said GPS signal.

6. A FM multiple signal receivable navigation apparatus according to claim 3, said FM multiple signal receiving antenna is connected with said FM multiple signal receiver unit through a noise reduction member.

7. A FM multiple signal receivable navigation apparatus according to claim 4, said GPS signal receiving antenna unit includes a GPS signal receiving antenna and an amplification member for said GPS signal.

8. A FM multiple signal receivable navigation apparatus according to claim 4, said FM multiple signal receiving antenna is connected with said FM multiple signal receiver unit through a noise reduction member.

9. A FM multiple signal receivable navigation apparatus according to claim 2, wherein a PCMCIA card is served as said connector.

10. A navigation device including a compact dual antenna, comprising:

a frequency modulation (FM) receiver for receiving an FM signal;

a global positioning satellite (GPS) receiver for receiving a GPS signal;

a GPS antenna; and an integral coaxial cable having an inner conductive core wrapped in an insulator layer and surrounded by an outer conductive shield, wherein said coaxial cable electrically connects said GPS receiver to said GPS antenna, and said conductive shield electrically connects at one end to said FM receiver and acts as an FM antenna only for said FM receiver.

11. A navigation device including a compact dual antenna as recited in claim 10, wherein said GPS antenna is a patch antenna.

12. A navigation device including a compact dual antenna as recited in claim 10 wherein said FM receiver and said GPS receiver are contained in a single unit.

13. A navigation device including a compact dual antenna as recited in claim 10 wherein said GPS antenna and said FM receiver are contained in a single unit and said GPS antenna is connected to said GPS receiver through said coaxial cable via a PCMCIA card.

* * * * *